UNITED STATES PATENT OFFICE.

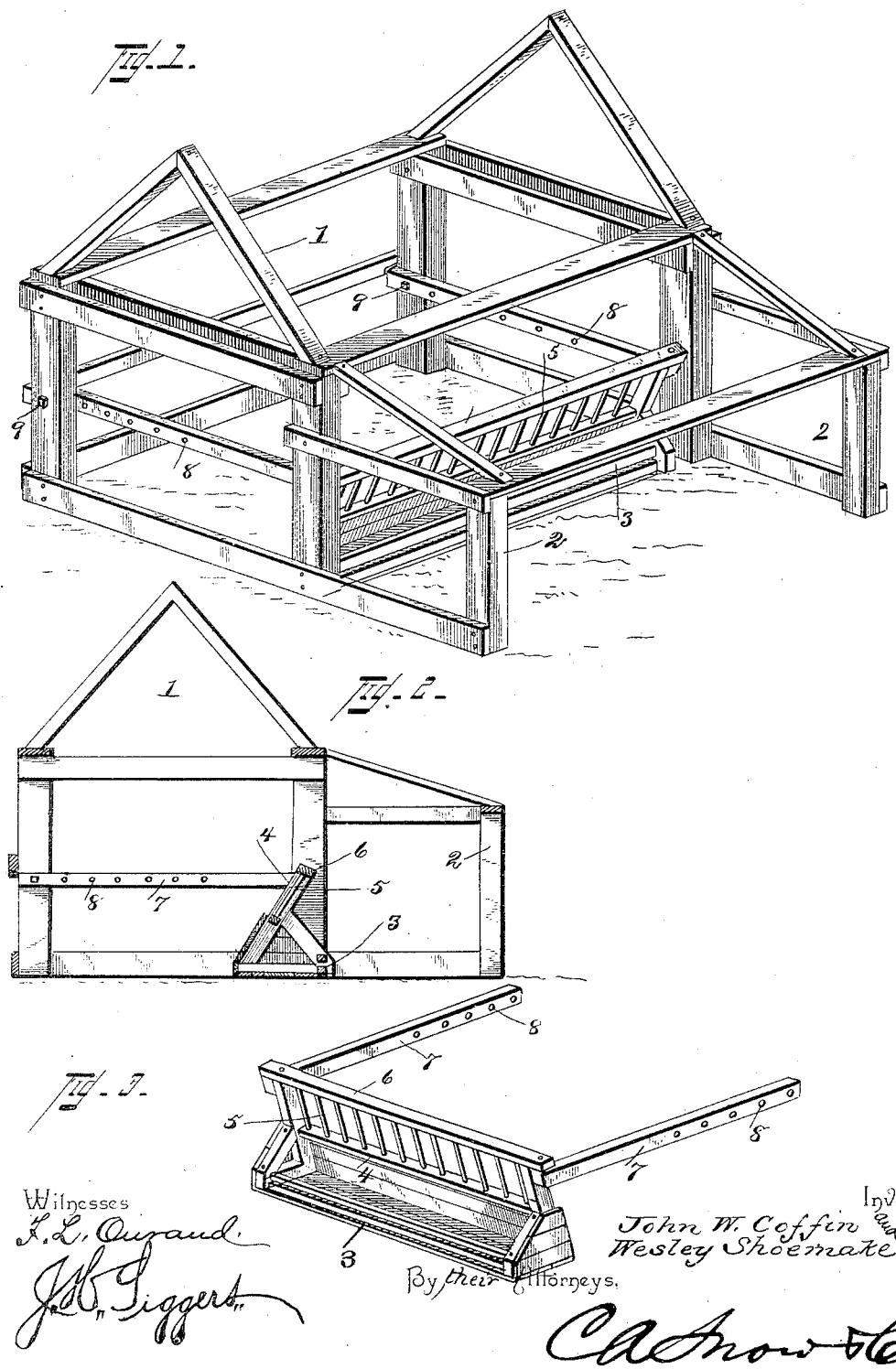

JOHN W. COFFIN AND WESLEY SHOEMAKE, OF OSKALOOSA, IOWA.

ADJUSTABLE HAY SHIELD AND MANGER.

SPECIFICATION forming part of Letters Patent No. 445,162, dated January 27, 1891.

Application filed June 17, 1890. Serial No. 355,721. (No model.)

*To all whom it may concern:*

Be it known that we, JOHN W. COFFIN and WESLEY SHOEMAKE, citizens of the United States, residing at Oskaloosa, in the county of Mahaska and State of Iowa, have invented a new and useful Adjustable Hay Shield and Manger for Barns, Ricks, &c., of which the following is a specification.

The invention relates to an adjustable hay shield and manger for barns, ricks, and the like.

Heretofore stationary feed troughs or mangers have been employed, and it is necessary as the hay is eaten to rake a fresh quantity from the back of the barn and carry the same to the feed trough or manger in order to bring it within easy reach of the cattle; but this raking the hay from the back of the barn is laborious and consumes much time.

The object of the present invention is to obviate the above objections and provide an adjustable hay shield and manger designed to be employed in barns, ricks, or the like, and capable of being readily moved against the hay as fast as it is eaten to bring a fresh supply within the easy reach of the cattle.

The invention consists in the construction and novel combination and arrangement of parts hereinafter fully described, illustrated in the accompanying drawings, and pointed out in the claims hereto appended.

In the drawings, Figure 1 is a perspective view of a hay-barn provided with an adjustable shield and manger constructed in accordance with this invention. Fig. 2 is a longitudinal sectional view. Fig. 3 is a detail perspective view of the shield and manger.

Referring to the accompanying drawings, 1 designates a hay-barn of the ordinary construction having at its front the usual cattle-shed 2 and provided with an adjustable manger 3 and shield 4, that are adapted to be adjusted against the mass of hay contained in the barn as fast as the hay is eaten to bring a new supply within easy reach of the cattle, and thereby enable a barn and shed to be entirely filled with hay and a continual supply of the latter be maintained within easy reach of the cattle without necessitating raking hay from the rear of the barn and carrying it to the shield and manger, which construction is a great advantage and a saving of both time and labor. The adjustable hay shield and manger is not limited to use in barns, but is equally applicable to ricks and the like, and enables the entire amount of hay to be fed to the cattle without liability of waste. The manger 3 is of any desirable construction, and rests upon the ground or floor, and is provided at its upper rear edge with the hay-shield 4, consisting of a rectangular frame and vertical slats or bars 5, and the top bar 6 of the rectangular frame has bolted or similarly secured to its ends a pair of bars 7, which are parallel with each other and extend rearwardly from the shield and manger, and are provided with series of perforations 8, through which pass bolts 9, by means of which the parallel bars 7 are adapted to be secured to suitable supporting-posts that may form part of the structure of a barn, or where the adjustable shield and manger is employed at a hay-rick special supporting-posts are provided, and the bolts 9 are adapted to be engaged in the perforations 8 to adjust the manger and shield against the hay.

The parallel bars which support the rack may be constructed of any suitable material, and we desire it to be understood that we do not limit ourselves to the precise details of construction herein shown and described, as we may without departing from the spirit of the invention make minor changes therein.

The cattle pull the hay through the openings between the slats or bars 5, and what falls from their mouths is caught by the trough or manger and is not wasted.

The combined shield and manger may be constructed of sections and be bolted together in order to enable the sections to be readily separated to permit the shield and rack to pass the middle post of the barn.

The combined shield and manger rests firmly upon the ground, and may be readily adjusted against the mass of hay, and enables the entire amount to be eaten without waste and without the necessity of raking.

What we claim is—

1. The combination, with suitable supporting-posts, of the combined hay shield and manger, the bars 7, secured to the combined hay shield and manger, and means for adjustably securing the bars to the posts, substantially as described.

2. The combination, with suitable supporting-posts, of the combined shield and manger and the bars secured to the combined shield and manger and provided with series of perforations, whereby the bars are movably secured to the posts by means of bolts or the like, and the combined shield and manger adapted to be moved against the hay as the same is eaten, substantially as described.

In testimony that we claim the foregoing as our own we have hereto affixed our signatures in presence of two witnesses.

JOHN W. COFFIN.
WESLEY SHOEMAKE.

Witnesses:
J. A. HEINZMAN,
W. P. HAWKINS.